United States Patent
Lee et al.

(10) Patent No.: US 6,324,695 B1
(45) Date of Patent: Nov. 27, 2001

(54) METHOD AND APPARATUS FOR SELECTING AN IMAGE MODE FOR TELEVISION RECEIVERS

(75) Inventors: Jae Kyung Lee, Taegu; Kwan Seung Baek, Kyungsangbuk-Do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/696,488

(22) Filed: Aug. 14, 1996

(30) Foreign Application Priority Data

Aug. 16, 1995 (KR) .................................................. 95-25135

(51) Int. Cl.$^7$ .............................. H04N 5/262; H04N 5/44
(52) U.S. Cl. ........................... 725/38; 725/47; 348/564; 348/588; 348/678
(58) Field of Search .................................... 348/563–569, 348/565–588, 678, 679, 686, 687, 722; 345/326–328; 725/38, 47; H04N 5/45

(56) References Cited

U.S. PATENT DOCUMENTS

| | | | |
|---|---|---|---|
| 4,257,066 | * | 3/1981 | Kaneko et al. .......................... 358/183 |
| 4,698,664 | * | 10/1987 | Nichols et al. ......................... 348/184 |
| 4,729,028 | * | 3/1988 | Micic et al. ............................ 348/588 |
| 4,774,582 | * | 9/1988 | Hakamada et al. .................... 358/183 |
| 4,862,251 | * | 8/1989 | Belmares-Sarabia ................. 348/577 |
| 5,040,067 | * | 1/1989 | Yamazaki ............................... 358/183 |
| 5,109,482 | * | 4/1992 | Bohrman ................................ 345/328 |
| 5,191,423 | * | 3/1993 | Yoshida ............................... 358/191.1 |
| 5,191,645 | * | 3/1993 | Carlucci et al. ....................... 348/328 |
| 5,237,648 | * | 8/1993 | Mills et al. ............................. 348/328 |
| 5,398,074 | * | 3/1995 | Duffield ................................. 348/564 |
| 5,416,534 | * | 5/1995 | Hayashi et al. ........................ 348/687 |
| 5,422,677 | * | 7/1995 | Do .......................................... 348/568 |
| 5,434,625 | * | 7/1995 | Willis ..................................... 348/564 |
| 5,512,955 | * | 4/1996 | Toyoshima et al. ................... 348/569 |
| 5,528,304 | * | 6/1996 | Cherrick et al. ...................... 348/565 |
| 5,537,152 | * | 7/1996 | Ishikawa ............................... 348/564 |
| 5,555,026 | * | 9/1996 | Lee ........................................ 348/687 |
| 5,657,093 | * | 8/1997 | Park ....................................... 348/568 |
| 5,867,227 | * | 2/1999 | Yamaguchi ........................... 348/564 |

FOREIGN PATENT DOCUMENTS 01-264380 * 10/1989 (JP) .................................. H04N/5/44

* cited by examiner

Primary Examiner—Andrew Faile
Assistant Examiner—Reuben M. Brown

(57) ABSTRACT

An image mode selecting method and apparatus for a television receiver which can display n images corresponding to n image modes on a screen utilizing a picture-in-picture (PIP) display function, so that a user can easily select an optimum image among the displayed images. According to the method and apparatus, the n images corresponding to the n image modes are displayed on the n PIP regions of the screen, respectively, by pressing an image selection key, and then the optimum image among the n displayed images can be selected by pressing a numeral key corresponding to the selected image.

9 Claims, 5 Drawing Sheets

FIG. 7

|  | CONTRAST | BRIGHTNESS | CHROMA-TICITY | DISTINC-TION |
|---|---|---|---|---|
| IMAGE MODE 1 | 30 % | 40 % | 40 % | 30 % |
| IMAGE MODE 2 | 40 % | 41 % | 41 % | 33 % |
| IMAGE MODE 3 | 49 % | 42 % | 42 % | 37 % |
| IMAGE MODE 4 | 58 % | 44 % | 44 % | 40 % |
| IMAGE MODE 5 | 67 % | 46 % | 46 % | 43 % |
| IMAGE MODE 6 | 76 % | 48 % | 48 % | 47 % |
| IMAGE MODE 7 | 85 % | 50 % | 50 % | 50 % |
| IMAGE MODE 8 | 90 % | 53 % | 53 % | 53 % |
| IMAGE MODE 9 | 95 % | 56 % | 56 % | 56 % |
| ⋮ | ⋮ | ⋮ | ⋮ | ⋮ |
| IMAGE MODE n | 100 % | 60 % | 60 % | 60 % |

METHOD AND APPARATUS FOR SELECTING AN IMAGE MODE FOR TELEVISION RECEIVERS

BACKGROUND OF THE INVENTION

1. Field of the Invention

The present invention relates generally to image mode selection for television receivers. In particular, the present invention relates to a method and apparatus for selecting an image mode which can display a plurality of images on a plurality of divided portions of a display screen, respectively, whereby an optimum image among the displayed images can be selected by a user.

2. Description of the Prior Art

Generally, a television receiver, as shown in FIG. 1, is provided with a tuner section 101 for selecting a desired channel signal from radio frequency (RF) broadcasting signals received through an antenna ANT and converting the selected channel signal to video and audio intermediate frequency (IF) signals, an audio IF section 102 for processing the audio IF signal provided from the tuner section 101 to provide an audio signal to a loudspeaker 103, a video IF section 104 for processing the video IF signal provided from the tuner section 101 to provide a video signal, a color picture tube (CPT) processing section 105 for processing the video signal provided from the video IF section 104 so that the video signal is suitable for being displayed on a color picture tube (CPT) 106, a remote controller 107 for selecting a desired function or channel, a remote controller receiving section 108 for receiving an output signal of the remote controller 107, and a microcomputer 109 for receiving an output signal of the remote controller receiving section 108 and controlling the overall operation of the television receiver, the microcomputer 109 discriminating an input of an image mode selection key through the remote controller 107 and providing image data corresponding to the selected image mode to the video IF section 104.

The image mode selecting operation performed by the conventional television receiver as constructed above will now be explained.

The tuner section 101 selects a channel broadcasting signal among the broadcasting signals received through the antenna ANT, and converts the selected channel broadcasting signal to video and audio IF signals. The audio IF section 102 processes the audio IF signal outputted from the tuner section 101 to provide an audio signal to the loudspeaker 103. The video IF section 104 processes the video IF signal outputted from the tuner section 101 to provide a video signal. This video signal is inputted to the CPT processing section 105 and is converted to a format suitable for display on the CPT 106.

At this time, if a user is not satisfied with the present display state of the image being displayed on the CPT 106 screen, and thus enters the image mode selection key in the remote controller 107 to select an optimum image mode, the microcomputer 109 receives the image mode selection key signal through the remote controller receiving section 108, and determines the present mode as an image selection mode.

If the image selection mode is determined as above, the microcomputer 109 outputs to the video IF section 104 a pulse-width-modulated (PWM) signal corresponding to the present image mode, so that the present image and an on-screen display (OSD) for identifying that the present mode is the image selection mode are displayed on the CPT 106 screen.

Thereafter, if the user enters the image mode selection key in the remote controller 107 again, the microcomputer 109 outputs a PWM signal corresponding to another image mode to the video IF section 104. As a result, every time when the image selection key is entered, the selected image mode is displayed on the CPT 106 screen in the order of "image 1→image 2→image 3→ . . . image n". Accordingly, only one image is displayed on the CPT 106 screen in accordance with the input of the image selection key.

The user may select an optimum image among the images which are sequentially displayed on the CPT 106 screen in accordance with the input of the image selection key in the remote controller 107.

However, the conventional image mode selecting method for a television receiver has drawbacks in that since only one image is displayed on the screen by each input of the image selection key, the user may have difficulty in accurately comparing a plurality of images with one another, and thus the user's selection of the optimum image among them will become difficult. Especially, in the event that the image data is precisely changed for each image mode, it becomes more difficult for the user to recognize such an image change for each image mode.

SUMMARY OF THE INVENTION

It is an object of the present invention to solve the problems involved in the prior art, and to provide a method and apparatus for selecting an image mode for a television receiver which can display n images on n divided picture-in-picture (PIP) regions of a display screen, respectively, by entering an image selection key, whereby a user can easily select an optimum image by comparing the n images with one another which are simultaneously displayed on the display screen.

In order to achieve the above object, the present invention can be implemented by providing hardware capable of performing an n-PIP-scene process, and software capable of controlling an n-image display and selection.

In one aspect of the present invention, there is provided an image mode selecting method for a television receiver comprising the steps of:

determining whether or not an image selection key is inputted;

displaying in order n images on corresponding picture-in-picture (PIP) regions of a display screen if it is determined that the image selection key is inputted;

determining whether or not the present on-screen display (OSD) is for an image selection mode if it is determined that the image selection key is not inputted;

determining whether or not a numeral key corresponding to an image to be selected is inputted if it is determined that the present OSD is for the image selection mode; and setting the image mode corresponding to the inputted numeral key if it is determined that the numeral key is inputted, turning off the PIP-scene process, and clearing the OSD displayed on the display screen.

In another aspect of the present invention, there is provided an image mode selecting apparatus for a television receiver comprising:

a tuner for selecting a channel broadcasting signal from channel broadcasting signals received through an antenna by tuning, and converting said selected channel broadcasting signal to video and audio intermediate frequency (IF) signals;

audio IF processing means for processing said audio IF signal provided from said tuner to provide an audio signal;

video IF processing means for processing said video IF signal provided from said tuner to provide main color signals;

video encoding means for converting said color signals to a composite video signal by compression of said color signals provided from said video IF processing means;

picture-in-picture (PIP) processing means for converting said composite video signal provided from said video encoding means to sub-color signals in accordance with position data;

color picture tube (CPT) processing means for synthesizing said main color signals from said video IF processing means and said sub-color signals from said PIP processing means, and converting said synthesized color signals into a format suitable for displaying on a CPT;

key input means for entering an image selection key and numeral keys corresponding to n image modes, respectively; and control means for controlling said video IF processing means and said PIP processing means so that n image modes are displayed on corresponding PIP regions of a screen of said CPT when said image selection key is inputted, and for controlling said video IF processing means and said PIP processing means so that an image mode selected among said n image modes is displayed on said CPT screen when one of said numeral keys corresponding to said selected image mode is inputted.

BRIEF DESCRIPTION OF THE DRAWINGS

The above objects, other features, and advantages of the present invention will become more apparent through the following description of the preferred embodiment of the present invention made with reference to the attached drawings, in which:

FIG. 7 is a table exemplifying the image data for each image mode according to the present invention.

DETAILED DESCRIPTION OF THE PREFERRED EMBODIMENT

Figure 1:
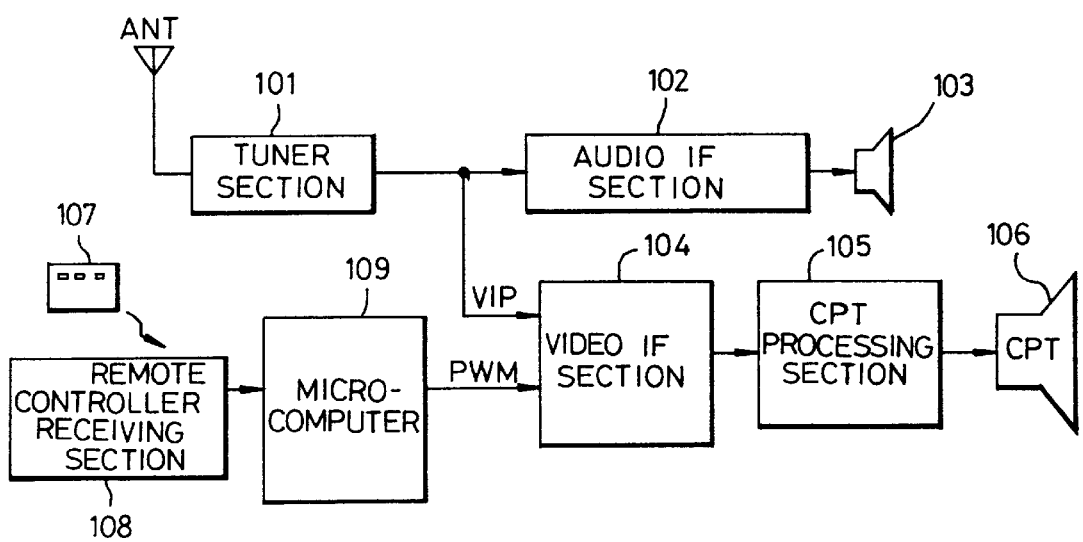
FIG. 1 is a block diagram illustrating the construction of a television receiver implementing a conventional image mode selecting method.
Figure 3:
FIG. 3 is a view explaining the image display state when an image selection mode is set according to a conventional method.
Figure 2:
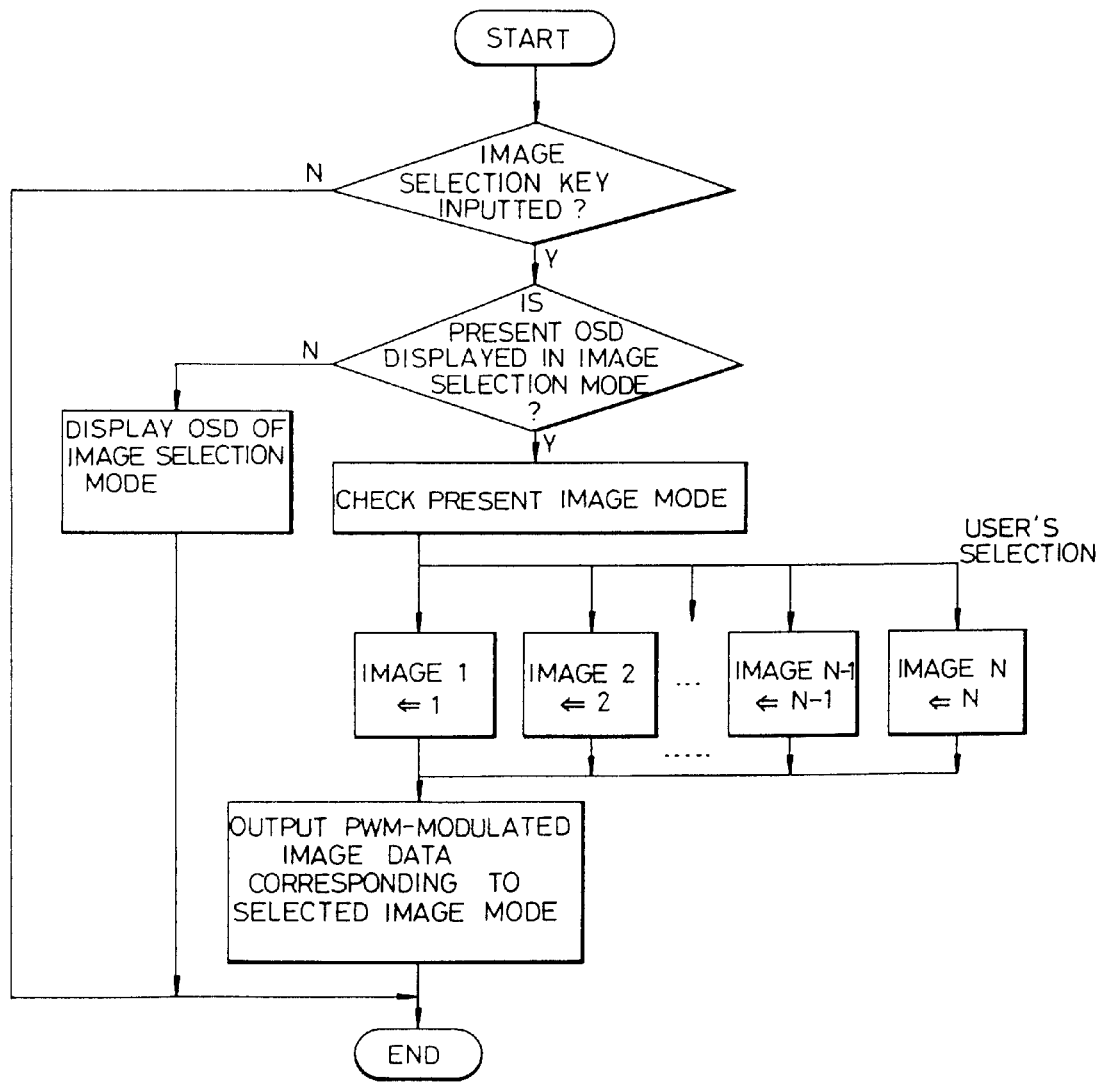
FIG. 2 is an algorithm diagram incorporating a conventional image mode selecting method.
Figure 4:
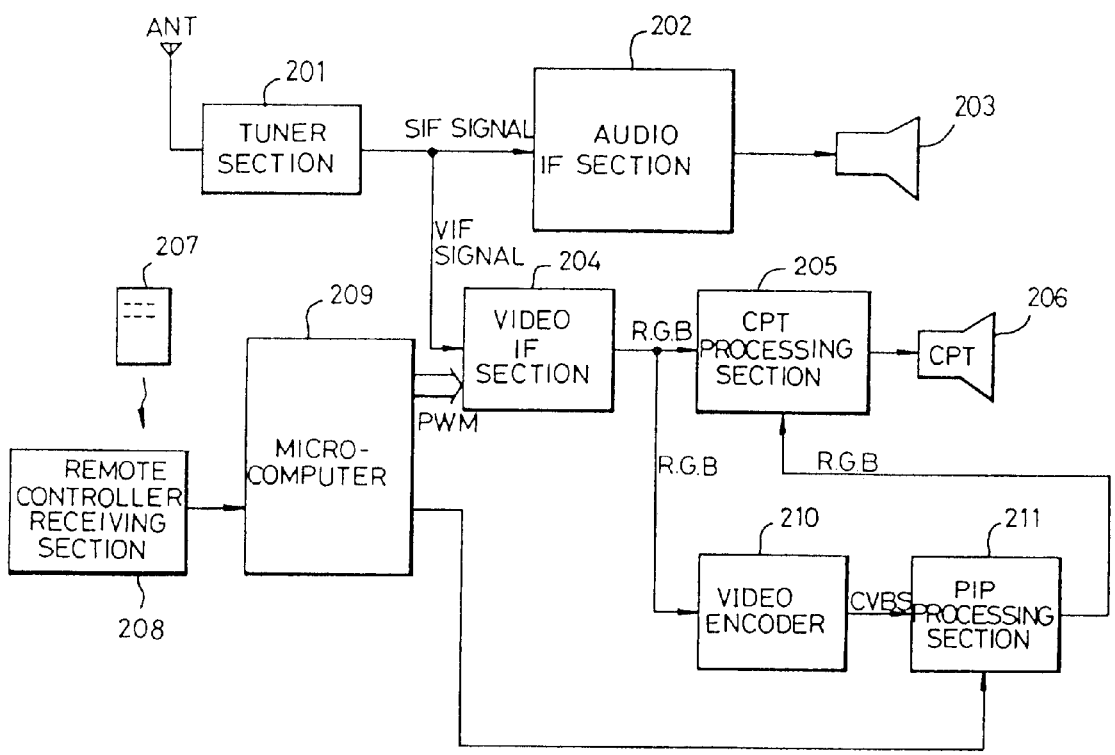
FIG. 4 is a block diagram illustrating the construction of the image mode selecting apparatus according to the present invention.

FIG. 4 is a block diagram of the image mode selecting apparatus for a television receiver according to the present invention.

Referring to FIG. 4, the image mode selecting apparatus according to the present invention is provided with a tuner 201 for selecting a channel broadcasting signal among high frequency channel broadcasting signals received through an antenna ANT by tuning and converting the selected channel broadcasting signal to video and audio IF signals, an audio IF processing section 202 for processing the audio IF signal outputted from the tuner 201 to provide an audio signal to a loudspeaker 203, a video IF processing section 204 for processing the video IF signal provided from the tuner 201 to R, G, and B main color signals, and a video encoder 210 for converting the R, G, and B color signals provided from the video IF processing section 204 to a composite video signal by performing compression with respect to the R, G, and B color signals.

The image mode selecting apparatus according to the present invention is also provided with a PIP processing section 211 for converting the composite video signal provided from the video encoder 210 to R, G, and B sub-color signals in accordance with position data, a CPT processing section 205 for synthesizing the main color signals from the video IF processing section 204 and the sub-color signals from the PIP processing section 211 to provide the synthesized color signals to a CPT 206, a remote controller 207 for entering an image selection key and numeral keys for selecting one of n image modes, a remote controller receiving section 208 for receiving the output signal of the remote controller 207, and a microcomputer 209 for providing a control signal corresponding to the present image mode to the video IF processing section 204, and providing another control signal corresponding to a selected image mode to the video IF processing section 204 if it is determined that the image selection key is inputted by checking the output signal of the remote controller receiving section 208, the microcomputer 209 providing the position data for displaying the corresponding image mode to the PIP processing section 211.

The operation of the image mode selecting apparatus according to the present invention as constructed above will be explained with reference to FIGS. 4 to 7.

If a user selects a desired channel using the remote controller 207, the remote control signal outputted from the remote controller 207 is received to the remote controller receiving section 208. The microcomputer 209 recognizes the selected channel from the output signal of the remote controller receiving section 208, and outputs a control signal for selecting the corresponding channel broadcasting signal to the tuner 201.

The tuner 201 selects the corresponding channel broadcasting signal among the broadcasting signals received through the antenna ANT in accordance with the control signal received from the microcomputer 209, and converts the channel broadcasting signal to the video and audio IF signals.

The audio IF processing section 202 processes the audio IF signal outputted from the tuner 201 and provides an audio signal to the loudspeaker 203. The video IF section 204 processes and converts the video IF signal outputted from the tuner 201 to the R, G, and B color signals in accordance with the control signal provided from the microcomputer 209 to provide the R, G, and B color signals to the CPT processing section 205. The CPT processing section 205 converts the inputted color signals into a format suitable for displaying on the CPT 206, and provides the color signals to the CPT 206, so that the image is displayed on the CPT screen.

Figure 6:
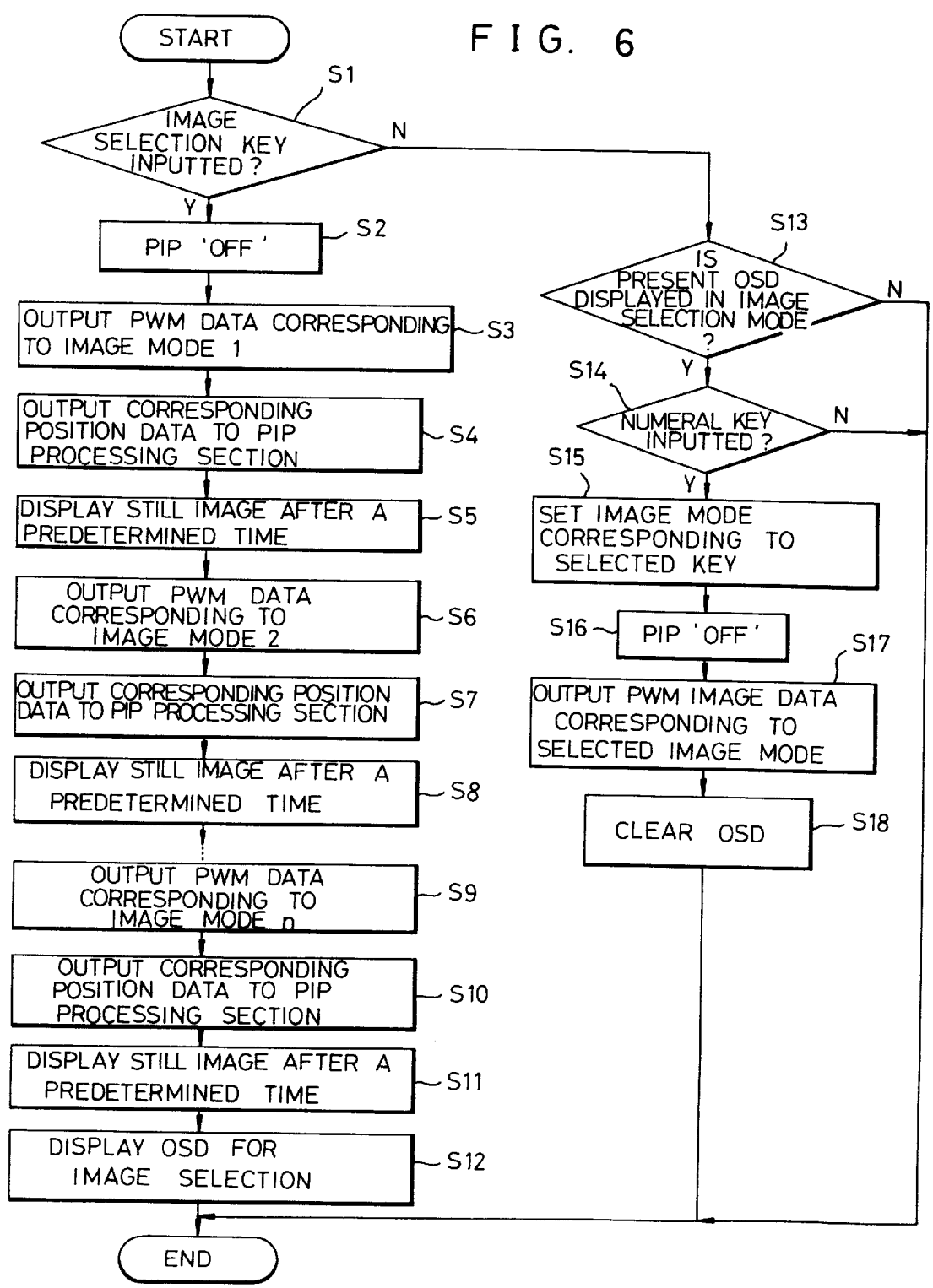
FIG. 6 is an algorithm diagram incorporating the image mode selecting method according to the present invention.

At this time, if a user is not satisfied with the present state of the image being displayed on the CPT 206 screen, and thus enters the image selection key in the remote controller 207, the microcomputer 209 recognizes that the image selection mode is selected (step S1 in FIG. 6). At this time, if a PIP-scene is displayed on the screen, the microcomputer 209 controls the PIP processing section 211 to turn off the PIP-scene (step S2 in FIG. 6), outputs to the video IF processing section 204 a PWM-modulated image data corresponding to a first image (step S3 in FIG. 6), and outputs to the PIP processing section 211 a position data for displaying the first image (step S4 in FIG. 6).

The video IF processing section 204 processes the image data provided from the tuner 201 in compliance with the PWM-modulated data provided from the microcomputer 209, and outputs the R, G, and B color signals processed as above to the CPT processing section 205 and the video encoder 210.

At this time, the video encoder 210 converts the R, G, and B color signals inputted from the video IF processing section 204 to a composite video signal CVBS by compressing the inputted R, G, and B color signals by a compression factor of 1/n, and the PIP processing section 211 outputs R, G, and B color signals corresponding to the composite video signal to the CPT processing section 205 so that the compressed composite video signal is displayed on a corresponding PIP region of the CPT 206 screen by calculating the position data provided from the microcomputer 209.

Figure 5:
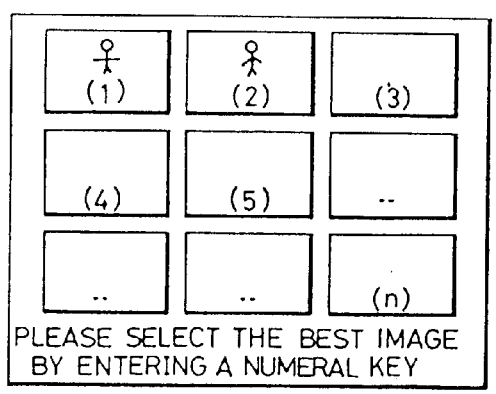
FIG. 5 is a view explaining the image display state when an image selection mode is set according to the present invention.

The CPT processing section 205 synthesizes the R, G, and B main color signals outputted from the video IF processing section 204 and the R, G and B sub-color signals outputted from the PIP processing section 211 to provide the synthesized color signals to the CPT 206. Accordingly, the first image corresponding to the first image mode data as shown in FIG. 7 is displayed on the CPT 206 screen as shown in FIG. 5.

Thereafter, if it is determined that the first image has been displayed for a predetermined time, the microcomputer 209 converts the first image being displayed to a still image (step S5 in FIG. 6), and then outputs a second PWM-modulated image mode data as shown in FIG. 7 to the video IF processing section 204 so that a second image corresponding to the second image mode data is displayed on a corresponding PIP region of the CPT 206 screen (step S6 in FIG. 6). The second image is displayed on the corresponding PIP region as shown in FIG. 5 in the same manner as the first image display (step S7 in FIG. 6).

Thereafter, if the second image is converted to a still image (step S8 in FIG. 6), the microcomputer 209 performs a control operation for displaying a third image. As shown in FIG. 5, such a display operation is repeated until the n-th image is displayed on the CPT screen as a still image as shown in FIG. 5 (steps S9, S10, and S11 in FIG. 6).

Specifically, if the image selection key in the remote controller 207 is pressed, the microcomputer 209 sequentially outputs the PWM-modulated signals corresponding to the first to n-th images to the video IF processing section 204, while it sequentially outputs the position data for the corresponding images to the PIP processing section 211. At this time, after a predetermined time has elapsed since an image was displayed on a corresponding PIP region of the CPT screen, the displayed image is fixed as a still image. By repeating the above operation n times, all the first to n-th images are displayed on the CPT screen as still images as shown in FIG. 5.

As the n images are simultaneously displayed on the screen of the CPT 206 as described above, the user can compare the image display states of the n images on the CPT 206 screen simultaneously. At this time, the microcomputer 209 outputs a PWM-modulated signal to the video IF processing section 204 as well as outputs the position data to the PIP processing section 211 so that the on-screen characters such as "PLEASE SELECT THE BEST IMAGE BY ENTERING A CORRESPONDING NUMERAL KEY" are displayed on the predetermined OSD region of the CPT screen as shown in FIG. 5 (step S12 in FIG. 6).

In the event that the present OSD is for the image selection mode, the microcomputer 209 recognizes it (step S13 in FIG. 6), and thus waits for the entry of a numeral key.

In this state, if the user enters a numeral key corresponding to the optimum image by comparing the n images displayed on the CPT 206 screen, the microcomputer 209 recognizes it (step S14 in FIG. 6), and sets the image mode selected by the corresponding numeral key (step S15 in FIG. 6). Specifically, the microcomputer 209 controls the PIP processing section 211 to turn off the PIP-scenes (step S16 in FIG. 6), and outputs the PWM-modulated signal corresponding to the selected image mode to the video IF processing section 204 (step S17 in FIG. 6), and then clears the OSD (step S18 in FIG. 6) to complete the image selection operation.

Thereafter, the optimum image corresponding to the image mode data selected by the user is displayed on the screen of the CPT 206.

From the foregoing, it will be apparent that the present invention provides advantages in that it can display n images for the user's selection on the screen simultaneously, and thus the user can easily select the optimum image among them, providing convenience in use.

While the present invention has been described and illustrated herein with reference to the preferred embodiment thereof, it will be understood by those skilled in the art that various changes in form and details may be made therein without departing from the spirit and scope of the invention.

What is claimed is:

1. An image mode selecting method for a television receiver comprising the steps of:

determining whether or not an image adjustment key is inputted;

displaying a plurality of n images which are from the same channel, but different in their picture adjustment values, so that an entire view of each of the n image scenes is maintained on a display screen by sequentially processing a plurality of n image data corresponding to the plurality of n images if it is determined that the image adjustment key is inputted, wherein processing each of the n image data includes compressing the image data;

receiving a selection input selecting one among the plurality of images displayed on the screen;

setting an image mode corresponding to the selected image;

turning off the plurality of images displayed on the screen after the selection input is received; and displaying on the screen the image according to the set image mode.

2. An image mode selecting method as claimed in claim 1, wherein the step of displaying a plurality of images includes the step of displaying an on-screen display visually signalling that a user's selection input is being requested.

3. An image mode selecting method as claimed in claim 1, wherein the input of the image adjustment key and the selection input are performed by a user using a remote controller.

4. An image mode selecting method as claimed in claim 1, wherein said picture adjustment value comprises variable values of contrast, brightness, and chromaticity of the image.

5. An image mode selecting method as claimed in claim 1, wherein displaying a plurality of images includes displaying each currently displayed image of the plurality of images as a still image prior to displaying a next successive image of the plurality of images.

6. An image mode selecting method as claimed in claim 1, wherein displaying a plurality of images includes displaying each of the displayed images first as an image corresponding to a signal being broadcast on the channel and then converting that image to a still image.

7. An image mode selecting apparatus for a television receiver capable of displaying multiple images, comprising:

a tuner selecting a channel broadcasting signal from a plurality of channel broadcasting signals, and converting said selected channel broadcasting signal to video and audio intermediate frequency (IF) signals;

an audio IF section processing said audio IF signal provided from said tuner to provide an audio signal;

a video IF section processing said video IF signal provided from said tuner to provide main color signals;

a video encoder for converting said color signals to a composite video signal by compression of said color signals provided from said video IF section;

a sub-picture section converting said composite video signal provided from said video encoder to sub-color signals in accordance with position data;

a color picture tube (CPT) section synthesizing said main color signals from said video IF section and said sub-color signals from said sub-picture section, and converting said synthesized color signals into a format suitable for displaying on the CPT;

a key input controller including an image adjustment key and image mode selection key; and a controller controlling said video IF section and said sub-picture section so that an entire view of each of a plurality of images which are from the same channel, but different in picture adjustment values, is displayed on a screen of said CPT when said image adjustment key is inputted, and for controlling said video IF section and said sub-picture section so that one among the plurality of images is selected and displayed on the whole screen of said CPT when said image mode selection key corresponding to said selected image is inputted.

8. An image mode selecting apparatus as claimed in claim 7, wherein said key input controller comprises a remote controller.

9. An image mode selecting apparatus as claimed in claim 7, wherein said controller controls said video IF section and said sub-picture section to display an on-screen display visually signalling that the present mode is an image selection mode and that a user's input of said image mode selection key is being requested.

* * * * *